Jan. 28, 1930.   A. HUMPHREYS   1,744,768
MAGNETIC CHUCK
Filed Aug. 27, 1928   2 Sheets-Sheet 1

A. Humphreys
INVENTOR

By: Marks & Clerk
ATTYS.

Jan. 28, 1930.  A. HUMPHREYS  1,744,768
MAGNETIC CHUCK
Filed Aug. 27, 1928  2 Sheets-Sheet 2

Patented Jan. 28, 1930

1,744,768

UNITED STATES PATENT OFFICE

AUGUSTUS HUMPHREYS, OF OLDHAM, ENGLAND

MAGNETIC CHUCK

Application filed August 27, 1928, Serial No. 302,410, and in Great Britain October 22, 1927.

This invention relates to magnetic chucks and has for its object to provide an improved construction of chuck face or superface which is magnetized by being secured upon pole pieces having suitable windings thereon, and which is efficient and powerful in service.

My invention comprises a chuck face or superface consisting of adjacent bars of opposite polarity, with lateral extensions at intervals beneath the operative face abutting against similar extensions on alternate bars of similar polarity.

My invention further comprises a chuck face or superface of rectangular form in which the face consists of spaced long bar-like pole elements, each pole or bar being widened or thickened at intervals below the operative face so that it can pass beneath and half way across adjacent bars at each side and come into engagement with the similarly widened parts of alternate poles, such widened parts extending at right angles to the poles in the top face.

My invention further comprises a chuck face or superface of circular form in which the poles point in substantially a radial direction, the widened parts of the poles which extend beneath adjacent poles forming concentric rings for clamping upon the base poles which are suitably magnetized.

Referring to the accompanying sheet of explanatory drawings:—

The same reference letters in the different views indicate the same or similar parts.

Figure 1:
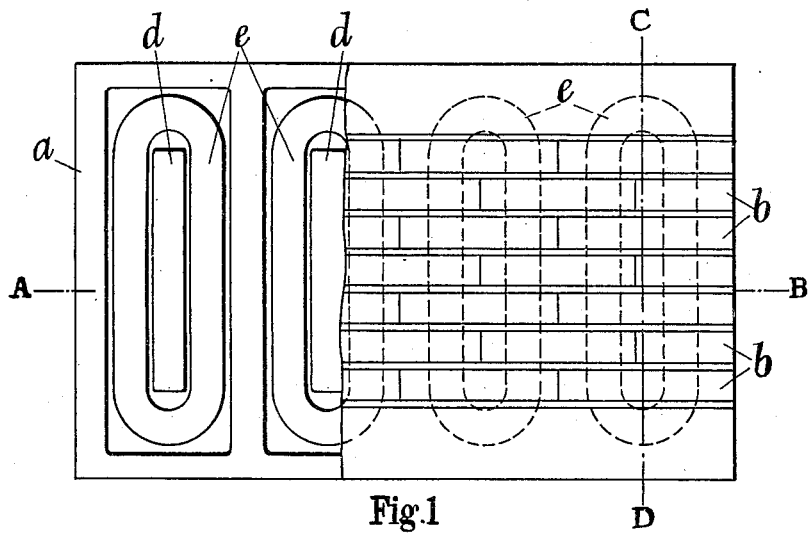
Figures 1–4 show a rectangular chuck face or superface, Figure 1 being a plan view showing the chuck face or superface in the right hand portion and the base in the left hand portion, Figure 2 a sectional elevation on the line A B of Figure 1, Figure 3 a cross section on the line C D of Figure 1, and Figure 4 a detail perspective view of portions of adjacent poles.
Figure 2:
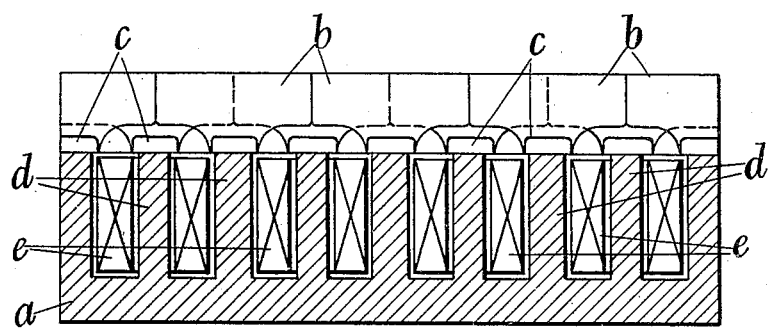
Figure 3:
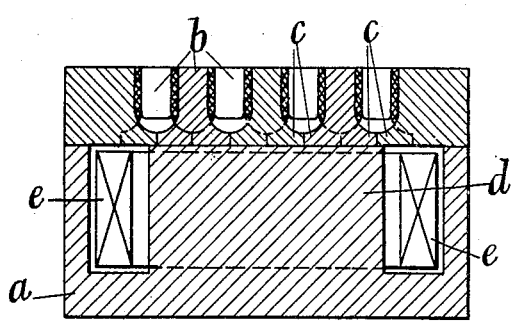
Figure 4:
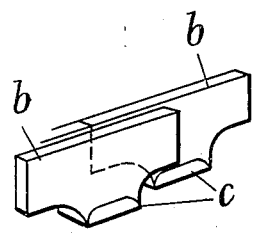
Figure 5:
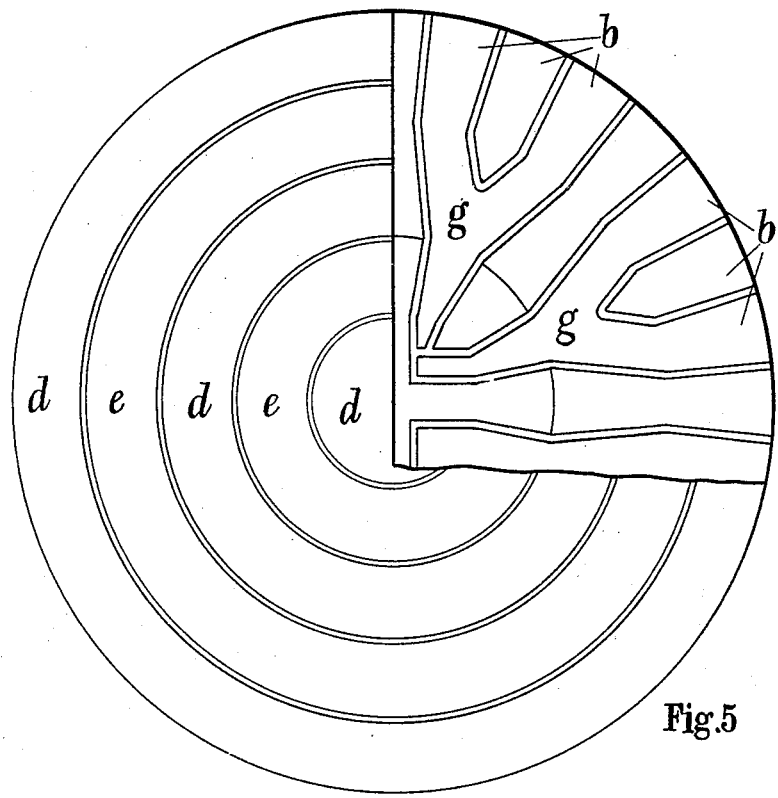
Figures 5 to 8 show a circular chuck face or superface, Figure 5 being a plan view showing the face or superface and also the base, Figure 6 a perspective view of one section of the superface, Figure 7 an inverted plan view of the section shown in Figure 6 and Figure 8 a part elevation and part sectional elevation of the face or superface upon its base.

In Figures 1 to 4 the face or superface to be applied to the chuck base $a$ comprises poles in the form of spaced long bar-like elements $b$ built up of sections of suitable width and length. Each pole or bar section is widened or thickened at $c$ at a point below the chuck face or superface (that is the top face in Figure 2) where it rests upon the chuck base $a$ so that such widened parts $c$ can pass beneath and half way across the adjacent bars $b$ at each side and come into engagement with the similarly widened parts of alternate poles, that is the poles of similar polarity as shown in Figure 3. The widened parts $c$ form the poles of an underface (that is the face which rests upon the top of the base $a$) for the chuck with the poles or abutting or widened parts $c$ at right angles to the poles $b$ of the top face in Figure 2, such underface poles formed by the widened parts $c$ being in line with and secured upon the base poles $d$ which are magnetized by suitable coils $e$.

In the case of the circular chuck face or superface shown in Figures 5 to 8, the top or working face has the poles $b$ pointing in substantially a radial direction (some poles being united into a Y form as at $g$ to fill in the circle).

Figure 6:
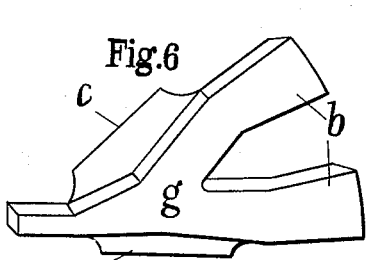
Figure 7:
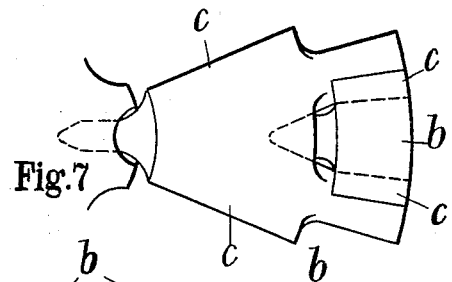
Figure 8:
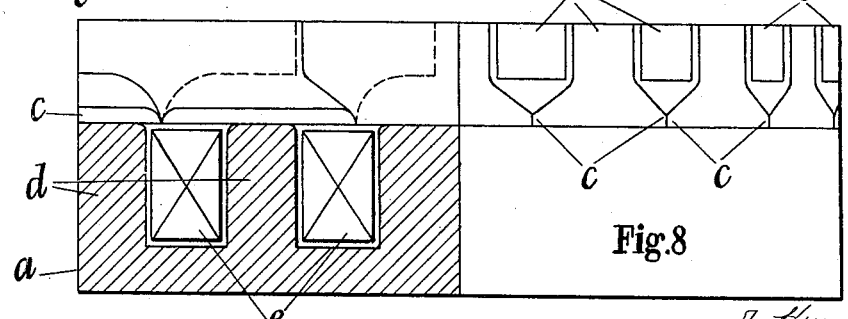

Each pole is widened at $c$ beneath the operative face as shown in Figures 6, 7 and 8 and the widened parts of similar poles abut against one another and produce two concentric rings which are energized by the concentric poles of the chuck base upon which they rest. It will be understood that in large chucks there may be several concentric rings and concentric poles.

The poles which are made of steel castings, are coated on their side faces with suitable non-magnetic metal and then the complete face or superface is formed into a solid element by running non-magnetic molten metal (such as brass) between the poles of the assembled unit. The poles of the face or superface are held down on the magnetized base poles by suitable means such as by screws.

By my improved construction, I obtain a powerful chuck face which makes use very effectively of the magnetism available from the magnetized base poles.

What I claim is:—

1. In magnetic chucks, a chuck face consisting of adjacent bars of opposite polarity each with lateral extensions at both sides at intervals beneath the operative face, such extensions passing beneath the adjacent bars of opposite polarity and abutting against similar extensions on alternate bars of similar polarity to produce continuous poles in the chuck underface.

2. In magnetic chucks, a chuck face or superface of rectangular form in which the face consists of spaced long bar-like pole elements, each pole or bar being widened or thickened at both sides at intervals below the operative face so that it can pass beneath and half way across adjacent bars of opposite polarity at each side and come into engagement with the similarly widened parts of alternate poles, such widened parts extending at right angles to the poles in the top face and constituting the poles of the underface.

In testimony whereof I have signed my name to this specification.

AUGUSTUS HUMPHREYS.